United States Patent [19]

Kazlauskas

[11] 4,379,963

[45] Apr. 12, 1983

[54] WELDING APPARATUS DESIGNED PARTICULARLY FOR USE WITHIN A CONFINED AREA

[76] Inventor: Gasparas Kazlauskas, 10219 Briarwood Dr., Los Angeles, Calif. 90024

[21] Appl. No.: 222,704

[22] Filed: Jan. 5, 1981

[51] Int. Cl.³ ............................................. B23K 9/225
[52] U.S. Cl. .................... 219/136; 219/60 A; 219/61.7; 219/66; 219/125.11
[58] Field of Search .................. 219/60 R, 60 A, 61.4, 219/61.7, 136, 66, 60.2, 137.41, 98, 86.21, 125.11; 7/167

[56] References Cited

U.S. PATENT DOCUMENTS

| | | | |
|---|---|---|---|
| 2,933,591 | 4/1960 | Wojciak | 219/137.31 |
| 3,111,575 | 11/1963 | Thompson | 219/86.41 X |
| 3,869,361 | 4/1975 | Jenkins | 219/98 X |

FOREIGN PATENT DOCUMENTS 570288 6/1945 United Kingdom .......... 219/137.31

OTHER PUBLICATIONS

"Tube Wezde R. Aids" in NASA Tech. Briefs., vol. 5#2 Summer 1980, p. 244.

*Primary Examiner*—Elliot A. Goldberg
*Attorney, Agent, or Firm*—Jack C. Munro

[57] ABSTRACT

A confined space welding apparatus which is to interiorly weld a tube to a structure such as a wall of an enlarged chamber. The position of the weld bead is initially determined through a set gage. This set gage is then employed to accurately position the welding electrode within the welding apparatus. The welding apparatus is includes collapsible handles to facilitate insertion of the welding apparatus within the enlarged chamber. The collapsible handles are then moved to their extended operable position and then the welding apparatus is securely clamped within a conduit positioning the welding electrode at the area to be welded.

21 Claims, 17 Drawing Figures

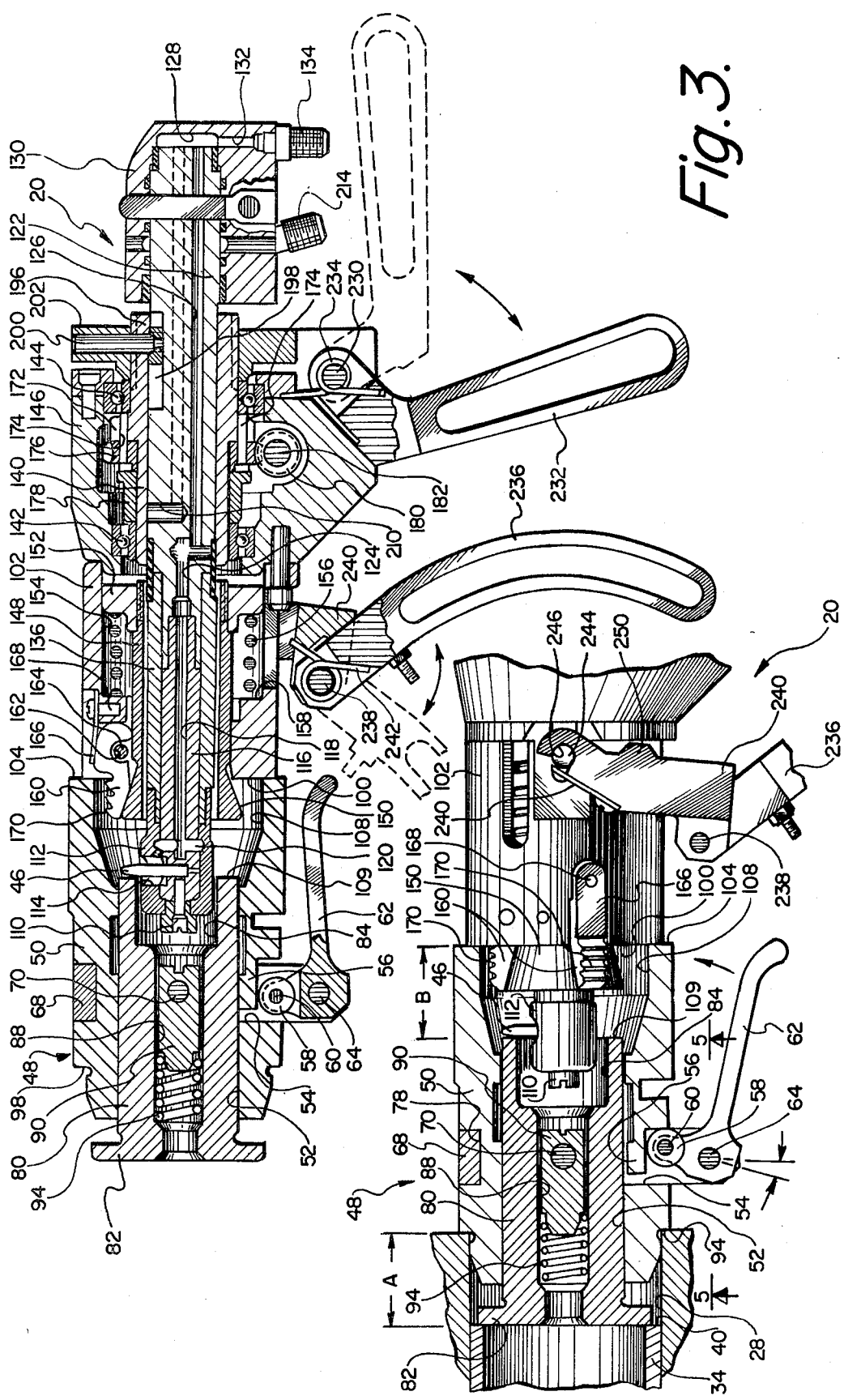

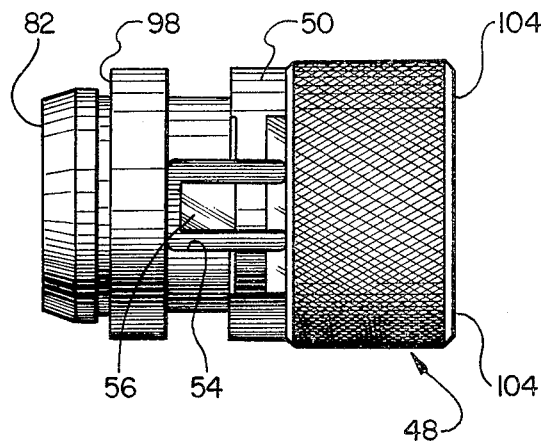
Fig.5.
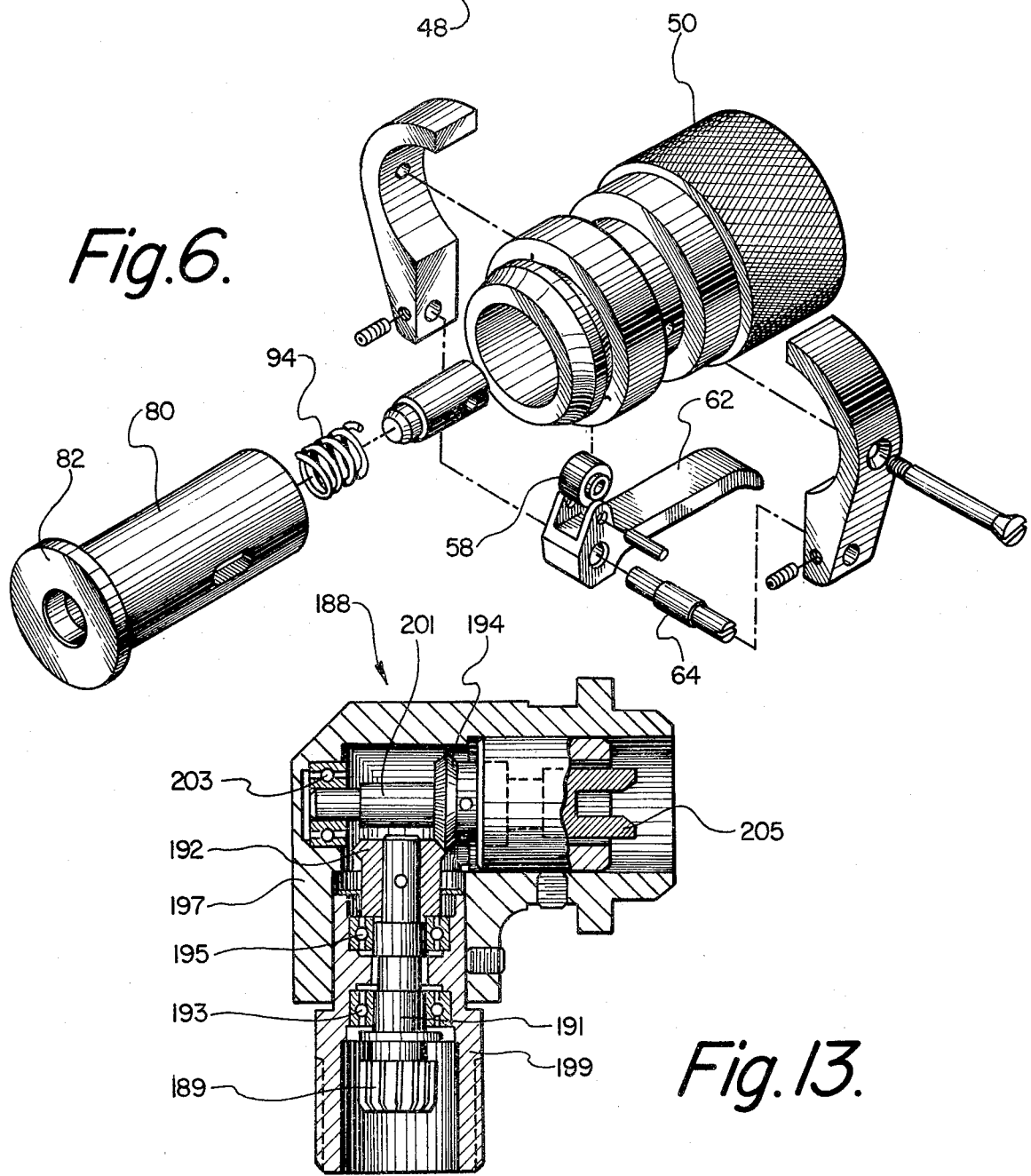
Fig.6.
Fig.13.

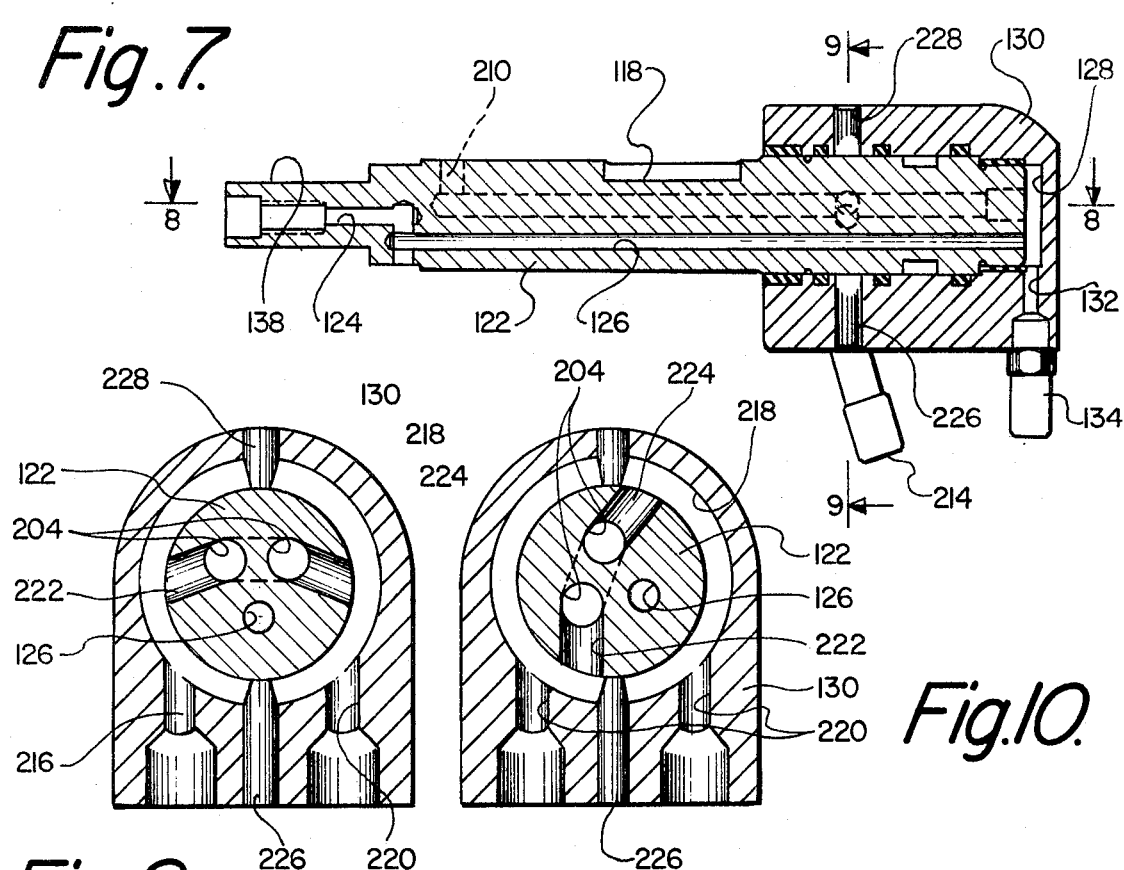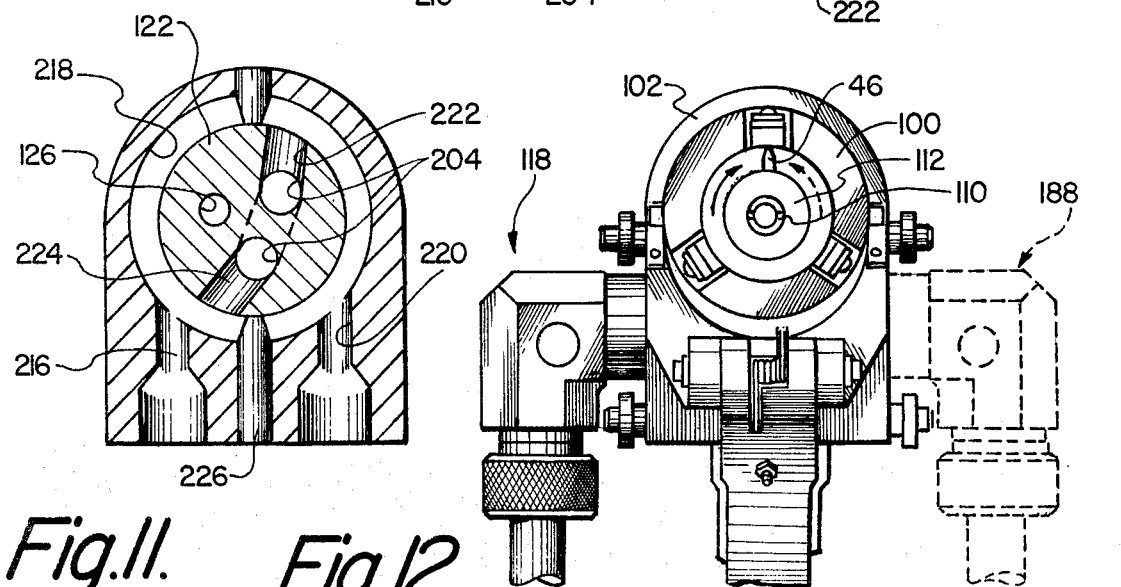

1

WELDING APPARATUS DESIGNED PARTICULARLY FOR USE WITHIN A CONFINED AREA

BACKGROUND OF THE INVENTION

The field of this invention relates to the welding of metallic tubular members by a known welding technique, such as gas shielded, tungsten, electro-arc welding process. More particularly, this invention is designed to interiorly weld tubes to an enlarged structure, such as a receiving chamber wherein a restricted access opening is the only means of access to within the receiving chamber. The welding operaton is to automatically produce an extremely strong and flawless weld.

The use of equipment to automatically weld cylindrical members has been previously known. In certain installations, it is difficult to obtain access for the performing of certain welding operations. It would be desirable to design a welding apparatus which could be utilized within a specific confined area and which could automatically produce a flawless weld.

SUMMARY OF THE INVENTION

The welding apparatus of this invention is designed to be employed within a specific confined area. The specific confined area takes the form of an enlarged walled chamber. Connected to the enlarged walled chamber are a plurality of tubes. Each tube connects with its own opening within the walled chamber. The end of each tube is spaced from the interior wall of the chamber. This spacing will normally vary from one tube to another tube. Access into the enlarged chamber is provided through an enlarged access opening. The welding head apparatus is to be collapsed and inserted through this access opening into the enlarged chamber. The welding electrode portion of the welding head apparatus is then to be located within the particular tube opening within which is it desired to create the weld. A handle means has now been extended when the welding apparatus is located within the enlarged chamber. Movement of the handle means causes the locating of a clamping apparatus in a retracted position and the welding electrode is then located in its proper position. Release of the handle assembly results in operation of the clamping assembly thereby fixing the position of the welding apparatus. A liquid cooling passage arrangement is included within the welding apparatus to keep the apparatus from over heating. To insure that the welding apparatus is installed at the proper position within the blind tube, a set gage is employed which is initially inserted within the specific tube opening and preset at the desired position. The set gage is then removed and the welding apparatus connected to the set gage with the welding electrode being moved to the proper location determined by the set gage.

The primary objective of this invention is to construct a welding head apparatus which is to produce flawless welds within blind tubular openings which are mounted within an enlarged chamber wall wherein the chamber wall has only a single access opening.

BRIEF DESCRIPTION OF THE DRAWINGS

FIG. 3 is a longitudinal cross-sectional view of the welding apparatus of this invention showing such employed in connection with the set gage included within FIG. 2;

FIG. 4 is the longitudinal cross-sectional view through the set gage of FIG. 3 but illustrating the set gage in its operating position and further illustrating the utilization of the set gage with the welding apparatus in order to accurately position the welding electrode of the welding apparatus;

FIG. 5 is a view of the set gage taken along line 5—5 of FIG. 4 wherein the locking handle of the set gage has been removed for purposes of illustration;

FIG. 6 is an exploded perspective view of the set gage utilized in conjunction with the welding apparatus of this invention;

FIG. 7 is a cross-sectional view through the shaft which is to cause revolving of the welding electrode included within the welding apparatus of this invention;

FIG. 8 is a cross-sectional view taken along line 8—8 of FIG. 7;

FIG. 9 is a cross-sectional view taken along line 9—9 of FIG. 7 showing the structural arrangement in order to achieve conducting of coolant to adjacent the welding electrode;

FIG. 10 is a view similar to FIG. 9 but showing the revolved shaft in a second position;

FIG. 11 is a view similar to FIG. 9 but showing the revolved shaft in a third position;

FIG. 12 is a front view of the welding apparatus of this invention depicting the alternate connection procedure of the driving assembly to rotate the welding electrode clockwise or counterclockwise;

FIG. 13 is a cross-sectional view of the driving assembly employed in conjunction with the welding apparatus of this invention;

DETAILED DESCRIPTION OF THE SHOWN EMBODIMENT

Figure 1:
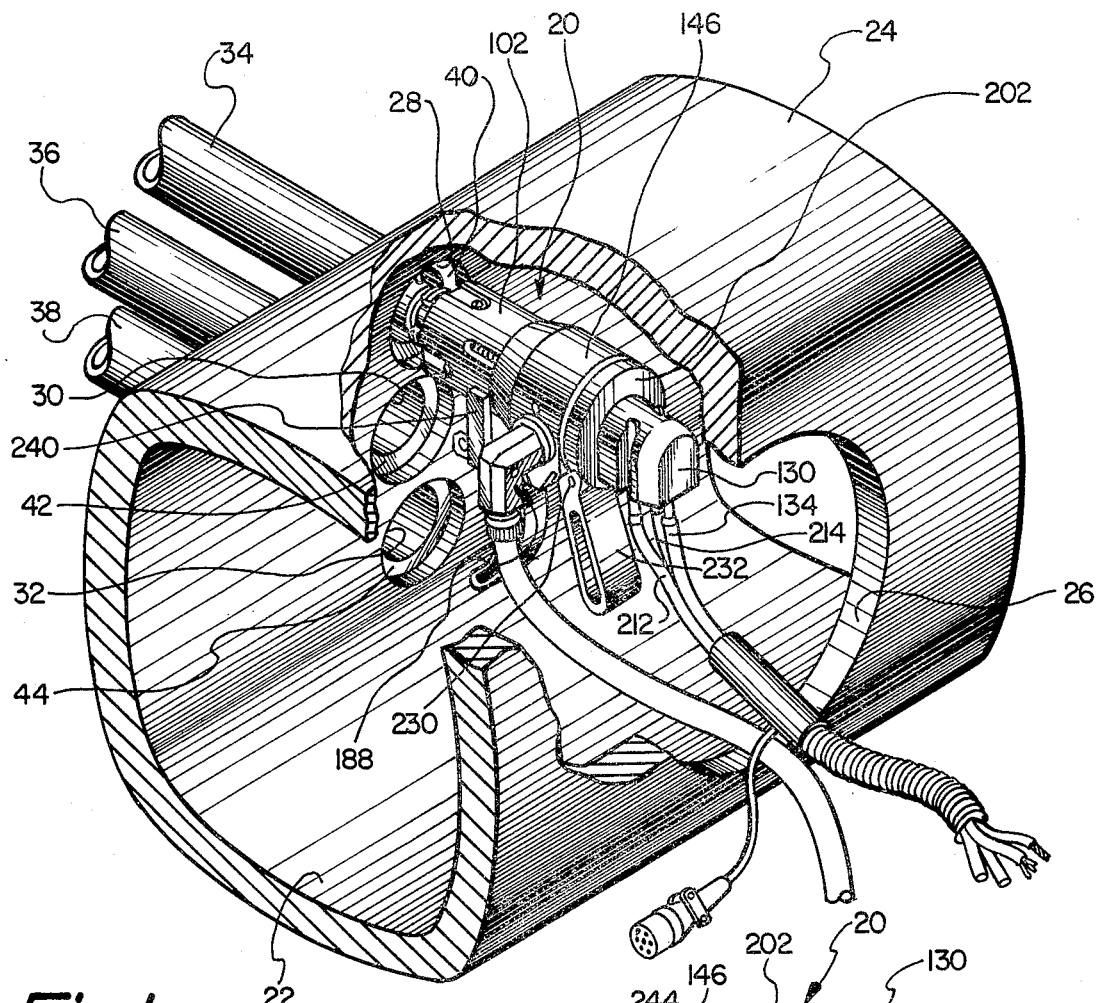
FIG. 1 is an exterior perspective view of the welding apparatus of this invention illustrating a typical welding operation.
Figure 2:
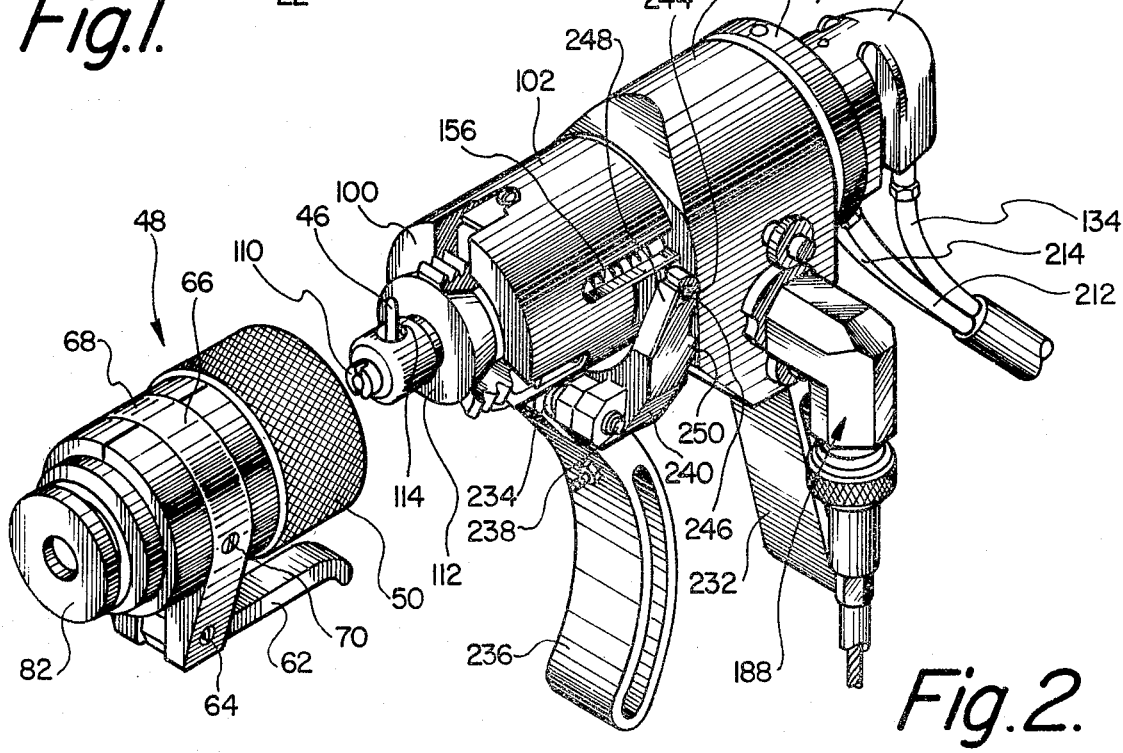
FIG. 2 is an exterior frontal perspective view of the welding apparatus of this invention and a set gage employed in connection therewith.

Referring particularly to the drawings, there is shown in FIG. 1, a typical structure within which is to be employed the welding apparatus 20 of this invention. The illustrative structure comprises an enlarged chamber 22 which is enclosed by sidewall 24. Within the sidewall 24 is formed an enlarged access opening 26. Also formed within the sidewall 24 are smaller openings 28, 30 and 32. The openings 28, 30 and 32 are identical in size and each respectively connects with a tube 34, 36 and 38. Each of the tubes 34, 36 and 38 have an end edge 40, 42 and 44, respectively. The spacing from the wall of the chamber 22 to each end wall, 40, 42 and 44 is not constant. Typical spacing variation would be up to one fourth of an inch.

Figure 16:
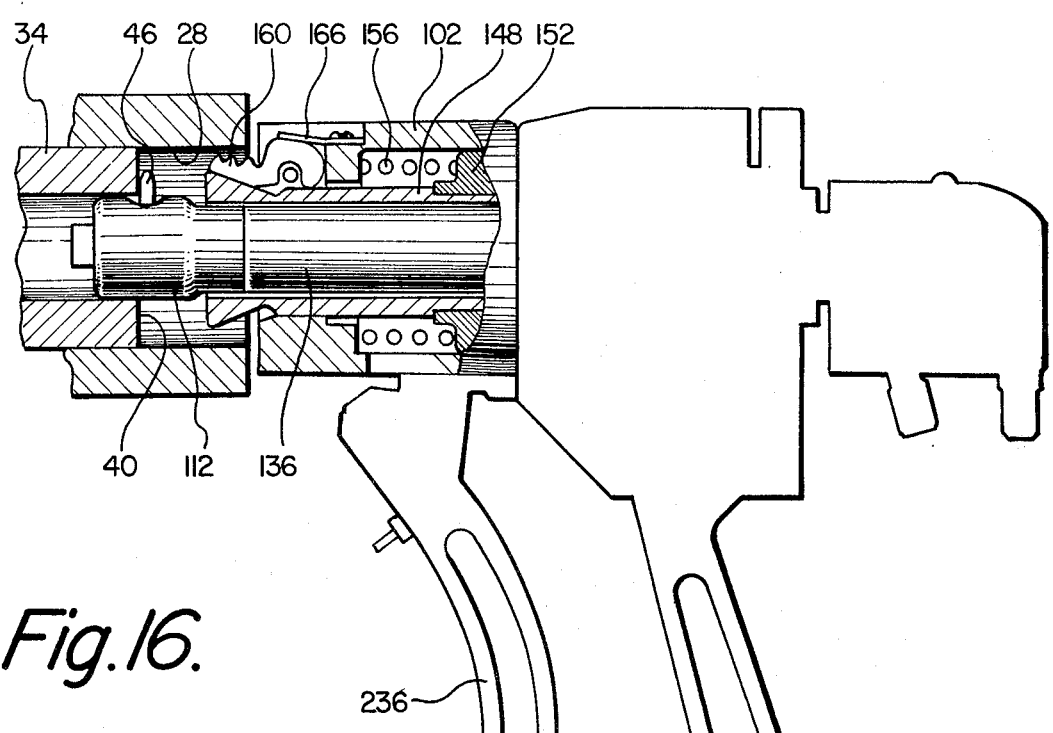
FIG. 16 is a cross-sectional view of the head portion of the welding apparatus of this invention but showing the clamping jaws in the non-engaging position wherein these jaws are to be employed to fix the position of the welding apparatus to the interior wall of a tube.
Figure 17:
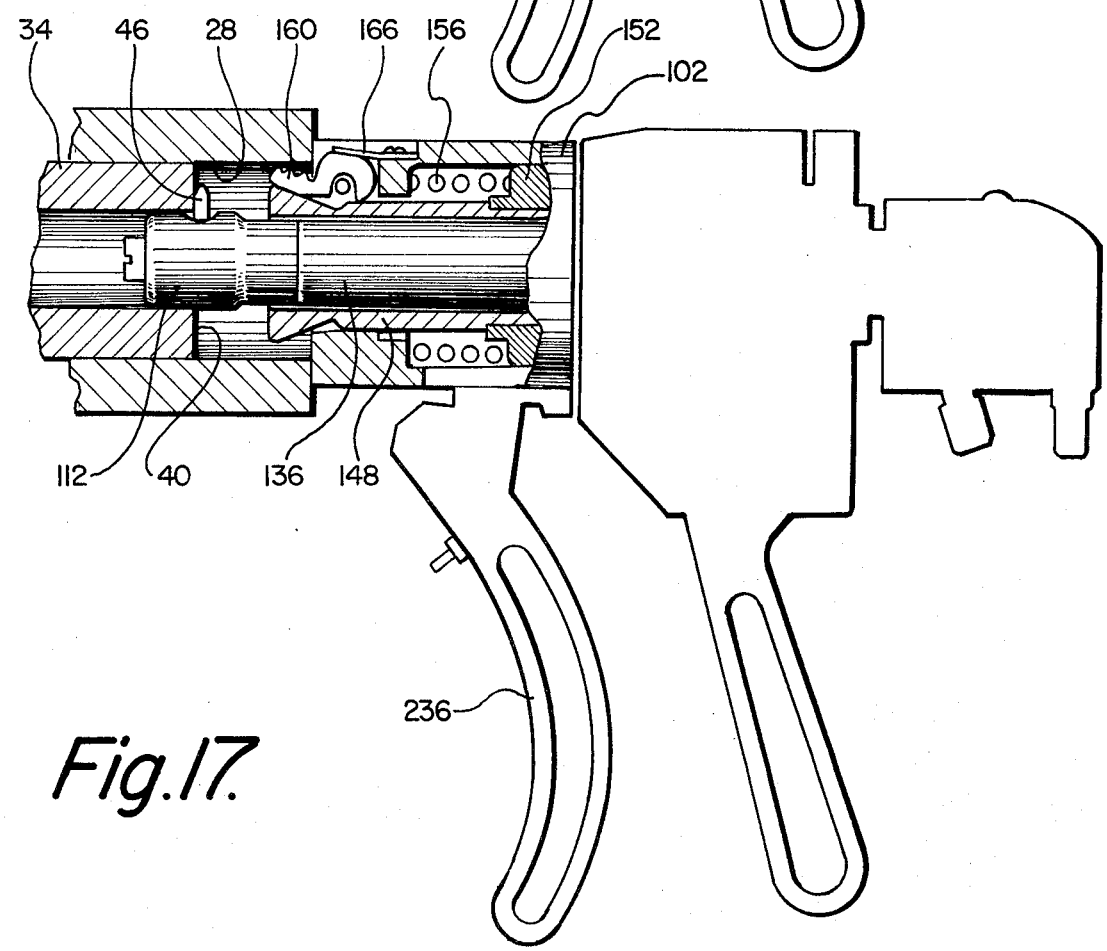
FIG. 17 is a view similar to FIG. 15 but showing the clamping jaws in the wall engaging position.

It is desired that the edges 40, 42 and 44 be welded to the wall of its respective openings 28, 30 and 32. For practical purposes, it can be said that each of the openings 28, 30 and 32 are blind to the ambient. This welding procedure must be precise in order to achieve the highest quality weld. This means that, for each edge 40, 42 and 44, regardless of its spacing from the wall of the chamber 22, the welding electrode 46 of the welding apparatus 20 must be located exactly as depicted within FIG. 16 of the drawings, that is, directly adjacent the end edge (40, 42 or 44).

In order to insure this accurate locating of the welding electrode 46, a set gage 48 is to be employed. The set gage 48 is to be initially located within the desired opening (either opening 28, 30 or 32) and then the gage 48 is to be operated to accurately locate the position of the end edge (either edge 40, 42 or 44). The welding electrode 46 is then to be set to this specific spacing for this particular opening.

The gage 48 includes a housing 50 which has an longitudinal center opening 52 formed therein. The center opening 52 is open at both the front end and the aft end of the housing 50.

Formed within a portion of the housing 50 is a U-shaped slot 54 which forms a thin, cantilevered section 56. This section 56, though metallic, is capable of being flexed a small amount, such as a few thousandths of an inch. In continuous contact with this cantilevered section 56 is a roller 58. The roller 58 is mounted by a pivot pin 60 to a lever 62. The lever 62 is pivotally mounted by means of a pivot pin 64 to clam shell brackets 66 and 68. These brackets, 66 and 68, are secured together by a bolt fastener 70. The bolt fastener 70 passes through an appropriate hole 72 within the bracket 66 and through hole 74 formed within the housing 50 and engages with threaded openings 76 formed within bracket 68. Clam shell brackets 66 and 68 fit within an annular groove 78 within the housing 50.

Slideably located within the center opening 52 is a sleeve 80. This sleeve 80 has an enlarged outer end 82. Formed within the inner end of the sleeve 80 is a recess 84. Formed through the side wall of the sleeve 80 is an elongated slot 86. The bolt 70 passes through the slot 86. Because the slot 86 is elongated, it can be seen that the sleeve 80 is permitted a limited amount of longitudinal movement within the opening 52 determined by the length of the slot 86.

Centrally located within the sleeve 80 is an elongated chamber 88. Within the chamber 88 is mounted a plug 90. The plug 90 includes a hole 92 through which the bolt 70 is conducted. The outer end of the plug 90 connects with a coil spring 94. The free end of the coil spring 94 is against a seal which is formed integral with the sleeve 80. The coil spring 94 functions to exert a continuous bias on the sleeve 80 tending to locate the outer end 82 in the furtherest spaced position from the housing 50.

The pivot pin 64 has a slotted end 96 which is adapted to engage with a tool, such as a screw driver. It is to be noted that the pivot pin 64 includes an enlarged center section. The longitudinal center axis of this center section is offset (approximately 0.015 thousandths of an inch) from the longitudinal center axis of the ends of the pivot pin 64. The ends of the pivot pin 64 pivot within the brackets 66 and 68. The purpose of the eccentric center section 64 is for reason of adjustment. That is, turning of the pivot pin 64 can move the position of the lever 62, as well as the roller 58, a total distance of thirty thousandths of an inch in respect to the cantilevered section 56. The section 56 functions as a brake shoe which is to be pressed against the sleeve 80.

With the lever 62 in the position shown in FIG. 4 of the drawing, the sleeve 80 is to be freely slidable within its center opening 52. However, when the lever 62 is manually moved to the position shown within FIG. 3, the roller 58 has pushed the section 56 against the sleeve 80 thereby fixing the position of the sleeve 80 in respect to the housing 50. The actual movement of the section 56 is no more than a few thousandths of an inch. The position of the pivot pin 64 is initially preset so that this desired braking action will be achieved. Once set, the pivot pin 64 remains in this position.

One of the smaller diametered ends of the pivot pin 64 is fixed to the bracket 66 by means of a set screw 65. Similarly, the opposite smaller diametered end of the pivot pin 64 is fixedly secured to the bracket 68 by means of set screw 67. The tightening of the set screws 65 and 67 is to be accomplished when the desired rotative position of the pivot pin 64 has been set so as to achieve the desired locking action of the lever 62.

In using of the set gage 48, the operator initially moves the lever 62 to the unlocked position shown within FIG. 4. The operator then manually inserts the set gage 48 through the access opening 26 and into the desired opening 28, 30 or 32. The operator fully inserts the set gage 48 until shoulder 98 comes into contact with the wall of chamber 22. At this time, the outer surace of the outer end 82 comes into contact with the appropriate end edge, such as end edge 40 of opening 28. The operator then moves lever 62 to the locked position which causes the section 56 to be pushed into tight connection with the sleeve 80. The set gage 48 at this time has, in essence, measured distance A, which is the distance from the shoulder 98 to the end edge 40.

The operator then removes the set gage 48 from the opening 28 and out through the access opening 26. The operator is to then place the shoulder 100 of the main housing 102 of the welding apparatus 20 in physical contact with the aft edge 104 of the set gage housing 50. At this particular time, the welding electrode 46 is located within enlarged chamber 108 which is formed within the aft end of the set gage housing 50. The operator is to then cause the welding electrode 46 to be moved so that it comes into abutting contact with the aft edge 109 of the sleeve 80 as is shown within FIGS. 3 and 4 of the drawings. The distance between the aft edge and the aft end 104 is equal to distance B. It is to be noted that distance B is not equal to distance A, but this distance allows for the proper positioning of the electrode 46 to the respective end edge (40, 42 or 44) so as to obtain the precise location of the welding electrode 46 in order to produce the highest quality weld. Once the position of the electrode 46 has been obtained, this position is fixed as will be explained further on in the specification and the welding apparatus 20 is ready to be used for the particular opening for which the welding electrode has been set.

Welding apparatus 20 will now be explained in detail as follows: The welding electrode 46 is fixedly secured by means of a fastener assembly 110 to a gas cup 112. The welding electrode 46 protrudes through an opening 114. The inner end of the electrode 46 is mounted within a mounting member 116. Centrally disposed within the mounting member 116 is a gas passage 118.

The mounting member 116 is screw threadingly attached to a shaft 122. Within the shaft 122 is a central passage 124. This central passage 124 connects with gas passage 118. Central passage 124 also connects with an offset passage 126 which is also formed within the shaft 122. The offset passage 126 connects with a chamber 128. This chamber 128 is formed within a cap 130. A passage 132 is formed within the cap 130 to connect with the chamber 128. A flexible tube assembly 134 connects with the passage 132. Inert gas from a source (not shown) is to be conducted through the flexible tube assembly 134 to within the chamber 128 and hence through the passages 126 and 124 into the passage 118. The inert gas is then supplied into the discharge chamber 120 and hence through the opening 114 to the welding area. This supply of inert gas to the welding area is deemed to be conventional and forms no specific part of this invention.

The gas cup 112 is fixedly attached to a sleeve 136. The mounting member 116 is also fixedly mounted within the sleeve 136. The inner end of the sleeve 136 is tightly secured over smaller diametered section 138 of the shaft 122.

The shaft 122 is fixedly mounted within a movable housing 140. The movable housing 140 is supported by means of spaced-apart bearing assemblies 142 and 144 within a first housing section 146. Fixedly secured by means of conventional fasteners to the first housing section 146 is the main housing 102. The main housing 102 and the first housing section 146 cooperate together to form the fixed housing of the welding apparatus 20 of this invention.

The sleeve 136 is located within, but spaced from, a second sleeve 148. The exterior surface of the outer end of the second sleeve 148 includes a cam surface 150 which generally comprises an annular inclined surface. The inner end of the sleeve 148 is threadably secured to a collar 152. The exterior surface of the collar 152 rests within the internal chamber 154 of the main housing 102.

Located within the internal chamber 154 and physically resting against the collar 152 is one end of a coil spring 156. The opposite end of the coil spring 156 abuts shoulder 158 formed within the main housing 102. Mounted within the main housing 102 are a plurality of jaw clamping members 160. Each jaw clamping member 160 has a groove 162 which is to connect with a pin 164. There is a separate pin 164 for each jaw clamping member 160. Each pin 164 is mounted within the main housing 102. Each pin 164 connects with a groove 162 of its respective jaw member 160. Each jaw member 160 is held in place with its respective pin 164 being located within its respective groove 162 by means of a leaf spring 166. It is to be understood that there will be a separate leaf spring 166 for each jaw clamping member 160. Each leaf spring 166 is fixedly secured to the housing 102 by means of a bolt 168. It is is to be further understood that there are three in number of the jaw clamping members 160 which are equiangularly spaced apart. The lower portion of each jaw clamping member 160 is to rest against the cam surface 150. The outer surface of each jaw member 160 is formed into a plurality of serrations 170.

Integrally formed onto the movable housing 140 is an annular collar 172. Fixedly attached by means of pins 174 to the collar 172 is a gear 176. Fixedly mounted about the movable housing 140 and located in between the bearing assembly 142 and the gear 176 is a spacer ring 178.

Figure 14:
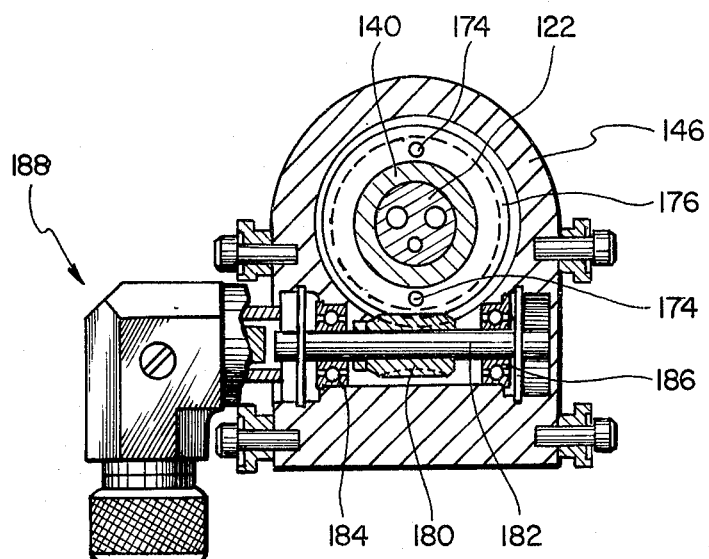
FIG. 14 is a view of the solid line structure shown within FIG. 12, but showing the driving assembly and the welding electrode assembly in cross-section and rotating of the welding electrode in the clockwise direction.
Figure 15:
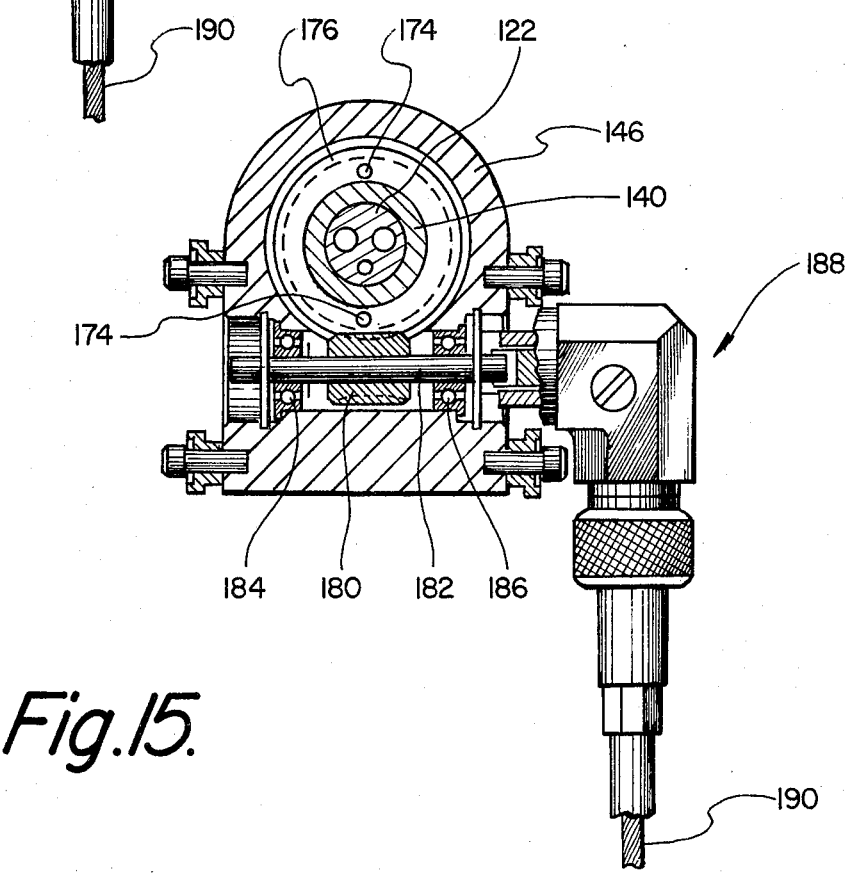
FIG. 15 is a view similar to FIG. 13 but showing the driving assembly connected to rotate the welding electrode in a counterclockwise direction.

The gear 176 meshes with a gear 180. Gear 180 is fixedly secured on a drive shaft 182. The drive shaft 182 is rotatably supported by bearing assemblies 184 and 816 within the interior chamber of the movable housing 146. Either end of the drive shaft 182 is to be engageable with a driving assembly 188. The drive assembly 188 is to optionally be connectable with either end of the shaft 182. Connection of the driving assembly 188 with one end of the shaft 182 causes the gear 180 to be driven clockwise (FIG. 13), while connection with the opposite end of the shaft 182 causes the gear 180 to be driven counter-clockwise (FIG. 14).

The driving assembly 188 comprises a flexible drive cable 190 which is connected through spline connection 189 to shaft 191. Shaft 191 is rotatably mounted by bearing assemblies 193 and 195 within sleeve 199 which is mounted within housing 197. Shaft 191 is attached to a first bevel gear 192. The first bevel gear 192 is to be rotated and since such is engaged with the second bevel gear 194, this bevel gear is in turn rotated. Bevel gear 194 is mounted on a shaft 201. The inner end of shaft 201 is rotatably supported by bearing assembly 203. Shaft 201 is to connect through connection 205 with shaft 182, which in turn causes rotation of that shaft.

The shaft 122, as well as the attached mounting member 116, sleeve 136, as welding electrode 46 and gas cup 112, is longitudinally movable with respect to the fixed housing comprising main housing 102 and first housing section 146. This movement is limited. The structure to limit this movement comprises a shoe 196 which is located wtihin a groove 198 formed within the shaft 122. The shoe is connected with a set screw 200. The set screw 200 is mounted within an opening provided within collar 202. The collar 202 is screw threadingly attached onto movable housing 140. Therefore, the shaft 122, as well as its connected structure is movable within the limits provided by the length of the groove 198. The longitudinal position of the shaft 122 can be fixed with respect to the movable housing 140 by tightening of the set screw 200, which in turn tightly presses the shoe 196 into contact with the shaft 122. With the longitudinal position of the movable housing 140 fixed with respect to the fixed housing, longitudinal movement of the shaft 122 in respect to the fixed housing is thereby prevented.

There is a substantial amount of heat generated in the area of the welding electrode 46. It is necessary that some of this heat be removed or damage to the welding apparatus will occur. This damage will occur principally if the heat is permitted to be conducted into the area of the shaft 122 and if left unchecked will substantially raise the temperature of the entire welding apparatus. In order to lower the temperature of the welding apparatus, there is included within the shaft 122 a water cooling passage 204. The passage 204 is basically U-shaped and begins and ends at the outer end of the shaft 122. At the outer end of the shaft 122 the passage 204 is plugged by plugs 206 and 208. The plugs 206 and 208 are to prevent intermixing of the cooling liquid, usually water, with the inert gas which is located within the chamber 128. The apex passage 210, which comprises the inner portion of the cooling passage 202, is located directly adjacent the central passage 124.

Cooling water from a source, not shown, is to be supplied into conduit 212 and out through conduit 214.

The cooling water from conduit 212 is conducted into passage 216 formed within the cap 130. The passage 216 connects with the annular chamber 218 formed within the cap 130. The inner surface of the annular chamber 218 is a portion of the exterior surface of the shaft 122. Also formed within the cap 130 is an outlet passage 220 which connects with the outlet conduit 214.

Formed within the shaft 122 is a first connecting passage 222 which connects with one leg of the passage 204. Also, there is a second connecting passage 224 which connects with the other leg of the passage 204. Both passages 222 and 224 connect with the chamber 218.

Mounted within the cap 130 and located in between passages 216 and 220 is a first pin 226. This first pin 226 is to have a pointed outer end which is to just touch the shaft 122. Diametrically opposite the position of the pin 226 is mounted a second pin 228 which is also fixedly mounted within the cap 130. This second pin also just touches the shaft 122.

The shaft 122 is rotated slowly making a single revolution every minute or longer. Referring particularly to FIG. 9, cooling water is conducted through the passage 216 into the left hand side of the chamber 218 and into the connecting passage 222 and into one leg of the cooling water passage 204. The water is then conducted through the apex passage 210 and through the other leg of the passage 204 and out through connecting passage 224, through the right hand portion of the chamber 218 and is discharged into conduit 214 through passageway 220. Water continues to flow in this direction until passageway 222 passes pin 226, which is beginning to occur in FIG. 10. After passageway 222 passes the pin 226, the direction of movement of the cooling water through the passageway 224 is reversed. For a few brief moments at the point of reversal, heated water that remains within the passageway 204 is passed again through the apex passage 210. However, this is not capable of causing any damage, since a substantial amount of water is conducted through the passage 204 within every single one half revolution of the shaft 122. The water continues to move in this reverse direction until the connecting passage 224 passes the pin 226 which is about to occur, as shown in FIG. 11.

It is to be noted that the cap 130 remains stationary as the shaft 122 rotates therewithin. Therefore, there are included within the cap 130 a plurality of appropriate bearing assemblies in order to prevent leakage of water and gas from the cap 130 during rotation of the shaft 122.

Attached to the first housing section 146 by means of a pin 230 is a first handle 232. The first handle 232 is movable between the retracted position shown by dotted lines in FIG. 3 to the extended position shown in solid lines in FIG. 3. A coil spring 234 is located about the pin 230 and exerts a continuous bias on the first handle 232 tending to locate such in the extended position.

A second handle 236 is pivotally connected by means of a pin 238 to a yoke 240. The second handle 236 is also movable between a retracted position shown by dotted lines in FIG. 3 to an extended position shown by solid lines in FIG. 3. A coil spring 242 is located about the pin 238 and functions to exert a continuous bias on the handle 236 tending to locate such in the extended position.

The yoke is basically U-shaped with the outer ends of each leg connecting with a pin, such as pin 244. The pin 244 rides within a recess 246 formed within one of the legs of the yoke 240. It is to be understood that the opposite leg of the yoke 240 will have a similar recess which cooperates with a similar pin and which is in axial alignment with the pin 242. Once the pin 244 is in position within the recess 246, a metallic strip 248 is attached to the yoke 240 by conventional fastening means. The strip 248 is to cover recess 246 and prevent accidental dislodgement of the pin 244 therefrom. It is to be understood that a similar mounting strip will be employed in conjunction with the opposite leg of the yoke 240.

The pin, such as pin 244, is fixedly secured to the collar 152. Each leg of the yoke 240 includes a protuberance 250. With the handles 232 and 236 in their extended position, the operator only need squeeze together these handles which causes a fulcrumming of the yoke 240 about the protuberances 250 against the first housing section 126. This produces a pivoting action which results in lineal movement of the collar 152 against the bias of the spring 154. Since the collar 152 is fixedly attached to the second sleeve 148, this second sleeve is moved lineally which results in the cam surface 150 being moved away from the pins 164. This causes the outermost portion of the jaw clamping member 160 to move radially inward toward the longitudinal center axis of the mounting member 116, which is also the axis of rotation for the shaft 122.

If the welding apparatus 20 of this invention has been located within the enlarged chamber 22, the operator is free to insert the welding electrode 46 into the proper position to weld the end edge 40 of the tube 34 to the interior wall of the opening 28. The operator then releases the handle 236 which causes this handle to move away from the handle 232, but still remain in the extended position. The bias of the coil spring 154 moves the collar 152 and the sleeve 154 and the cam surface 150 pushes against the jaw clamping members 160. As a result, the serrated surface 170 of each of the clamping members 160 is pushed tightly against the interior wall of the opening 28 thereby tightly securing the welding apparatus 20 in place at an exact position for the completing of the welding operation. The welding apparatus 20 is then activated creating the desired weld and after such has been completed, the operator only needs to again squeeze the handles 232 and 236 which will then cause release of the clamping members 140 and permit removal of the welding apparatus 20 from the opening 28. The foregoing procedure would be repeated for each of the openings 30 and 32.

When it is desired to remove (and also insert) the welding apparatus 20 from the enlarged chamber 22, the operator must move the handles 232 and 236 to the retracted position, which will permit the welding apparatus to be moved through the access opening 26.

What is claimed is:

1. A welding apparatus for producing a weld on a workpiece, said welding apparatus comprising:
    a main housing having a longitudinal center axis, said main housing being tubular having an elongagted opening;
    a shaft mounted within said elongated opening, said shaft being longitudinally movable along said longitudinal center axis and rotatable about said longitudinal center axis, a welding electrode connected to one end of said shaft, said welding electrode being spaced from said main housing, said welding electrode being rotated by rotation of said shaft;

securing means for longitudinally fixing said shaft relative to said main housing at a particular established position, said securing means being releasable permitting longitudinal movement of said shaft relative to said main housing; and handle means mounted upon said main housing, said handle means being movable between an operable position and a collapsed position, whereby said handle means is to be located in said collapsed position and said welding apparatus then moved through a confining opening into an enlarged internal chamber to be then utilized to weld with said handle means being moved to said operable position.

2. The welding apparatus as defined in claim 1 wherein said securing means comprises:

a secondary housing rotatably mounted on said main housing, said secondary housing being fixedly longitudinally with respect to said main housing, clamping means mounted on said secondary housing, said clamping means to be engagable with said shaft to thereby fix the position of said shaft relative to said secondary housing.

3. The welding apparatus as defined in claim 2 wherein:

said secondary housing being mounted within said main housing.

4. The welding apparatus as defined in claim 3 wherein:

driven gear means attached to said secondary housing, a drive gear rotatably mounted within said main housing, said drive gear to continuously engage with said driven gear to thereby rotate said secondary housing and said shaft.

5. The welding apparatus as defined in claim 4 wherein:

said drive gear to be engagable with a driving means for the purpose of rotating said drive gear, said driving means to be capable of engagement with said drive gear at two separate locations to thereby rotate said drive gear either clockwise or counterclockwise.

6. The welding apparatus as defined in claim 1 wherein:

said handle means comprising a fore handle and an aft handle, said fore handle being spaced from said aft handle.

7. The welding apparatus as defined in claim 1 including:

attachment means connected to said main housing, said attachment means being movable between a retracted position and an extended position, said extended position fixing said main housing onto a separate structure, said retracted position permitting disengagement of said main housing from the said separate structure.

8. The welding apparatus as defined in claim 7 wherein:

said attachment means being located directly adjacent said welding electrode.

9. The welding apparatus as defined in claim 7 wherein:

said attachment means comprising a plurality of spaced apart attaching members, each said attaching member being radially movable between said retracted position and said extended position in respect to said longitudinal center axis.

10. The welding apparatus as defined in claim 9 wherein:

said attaching members being normally located in said extended position, actuating means for causing movement of said attaching members to said retracted position.

11. The welding apparatus as defined in claim 10 wherein:

said actuating means including said fore handle, movement of said fore handle toward said aft handle results in movement of said attaching members to said retracted position.

12. The welding apparatus as defined in claim 7 wherein:

said attachment means being actuatable by movement of said fore handle.

13. The welding apparatus as defined in claim 11 including:

cooling means included within said shaft, said cooling means functioning to remove heat from the area of said welding electrode.

14. The welding apparatus as defined in claim 13 wherein:

said cooling means including a single fluid passage within said shaft.

15. The welding apparatus as defined in claim 7 wherein:

cooling means included within said shaft, said cooling means functioning to remove heat from the area of said welding electrode.

16. The welding apparatus as defined in claim 1 wherein:

cooling means included within said shaft, said cooling means functioning to remove heat from the area of said welding electrode.

17. The welding apparatus as defined in claim 16 wherein:

said cooling means including a single fluid passage within said shaft.

18. The welding apparatus as defined in claim 17 wherein:

a secondary housing rotatably mounted on said main housing, said secondary housing being fixed longitudinally with respect to said main housing, clamping means mounted on said secondary housing, said clamping means to be engageable with said shaft to thereby fix the position of said shaft relative to said secondary housing.

19. The welding apparatus as defined in claim 18 wherein:

said secondary housing being mounted within said main housing.

20. The welding apparatus as defined in claim 19 wherein:

driven gear means attached to said secondary housing, a drive gear rotatably mounted within said main housing, said drive gear to continuously engage with said driven gear to thereby rotate said secondary housing and said shaft.

21. The welding apparatus as defined in claim 20 wherein:

said drive gear to be engageable with a driving means for the purpose of rotating said drive gear, said driving means to be capable of engagement with said drive gear at two separate locations to thereby rotate said drive gear either clockwise or counterclockwise.

* * * * *